United States Patent [19]

Brachman et al.

[11] 4,116,925
[45] Sep. 26, 1978

[54] POLY(TETRAMETHYLENE TEREPHTHALATE)-POLYETHER BLOCK

[75] Inventors: Armand E. Brachman, Allentown, Pa.; Ghazi Khattab, Parsippany; Edwin M. Smolin, Kinnelon, both of N.J.

[73] Assignee: GAF Corporation, New York, N.Y.

[21] Appl. No.: 695,377

[22] Filed: Jun. 14, 1976

[51] Int. Cl.$^2$ .................... C08K 7/14; C08L 67/00; C08L 67/06

[52] U.S. Cl. .................. 260/42.18; 260/45.7 P; 260/45.75 C; 260/45.75 N; 260/45.85 R; 260/45.9 R; 260/860; 260/873

[58] Field of Search ................ 260/75 R, 860, 876 B, 260/42.18

[56] References Cited

U.S. PATENT DOCUMENTS

| | | | |
|---|---|---|---|
| B 236,266 | 3/1976 | Hoeschele | 260/75 R |
| 3,023,192 | 2/1962 | Shivers | 260/75 R |
| 3,766,146 | 10/1973 | Witsiepe | 260/75 R |
| 3,825,620 | 7/1974 | Koleske et al. | 260/873 |
| 3,849,515 | 11/1974 | Muller | 260/75 R |
| 3,864,315 | 2/1975 | Ohno et al. | 260/75 R |
| 3,890,279 | 6/1975 | Wolfe | 260/75 R |
| 3,891,604 | 6/1975 | Wolfe | 260/75 R |
| 3,954,689 | 5/1976 | Hoeschele | 260/75 R |
| 3,959,062 | 5/1976 | Hoh | 260/75 R |
| 3,959,230 | 5/1976 | Hays | 260/75 R |

FOREIGN PATENT DOCUMENTS 141,919 9/1974 Netherlands.

OTHER PUBLICATIONS

Chem. Abs. 56:P13071e; 64:P15996d, and e; 72:P32486r; 83:P80018p.

*Primary Examiner*—Thomas De Benedictis, Sr.
*Attorney, Agent, or Firm*—Walter C. Kehm; Joshua J. Ward

[57] ABSTRACT

Poly(tetramethylene terephthalate)-polyether block copolymers having materially increased heat deflection temperatures and incorporating within the polymer chain in random distribution 1 percent to 7 percent by weight of the polyether, poly(tetramethylene ether glycol) or polyethylene oxide; the polyether being added to the reaction mixture in the course of the polymerization reaction.

19 Claims, No Drawings

POLY(TETRAMETHYLENE TEREPHTHALATE)-POLYETHER BLOCK

BACKGROUND OF THE INVENTION

Linear copolyester elastomers having been described heretofore, as for example, in U.S. Pat. No. 3,766,146 prepared, illustratively, by catalytic reaction of a mixture of reactants comprising, illustratively, poly(tetramethylene ether glycol), 1,4-butanediol and dimethyl terephthalate. The copolyesters so prepared contain elevated percentages of reactant ether glycol component.

The preparation of polyalkylene terephthalatepolyether block copolymers in situ is described in Netherlands patent No. 141,919. However, the product polymers incorporate in excess of 10 percent by weight of polyether.

These higher proportions of polyether, while imparting certain desirable properties to the resulting polymer, do so frequently at a sacrifice of certain of the more desirable properties such as the elevated melting point had by the corresponding terephthalate homopolymer.

If a copolymer could be economically produced retaining the advantages of the homopolymer, poly(tetramethylene terephthalate), including retention of its melting point, while securing significantly enhanced heat distortion properties, high strength engineering thermoplastic resins would result having not only excellent moist high temperature electrical properties, as well as low creep characteristics, but would be suitable for enhanced use as, illustratively, gaskets or other sealant means for use in connection with automobile engines and the like while manifesting improved mold fill and process propensities and a significant advance in the state of the art would, as a result, be achieved.

SUMMARY OF THE INVENTION

It is, therefore, a principal object of this invention to provide novel poly(tetramethylene terephthalate)-polyether block copolymers.

It is a further object of this invention to provide linear tetramethylene terephthalate-polyether block copolymers in which the polyether component is randomly distributed and which constitute superior thermoplastic engineering resins.

It is a particular object of this invention to provide block copolymers such as the foregoing possessed of significantly high heat deflection temperatures which nevertheless retain a melting point similar to that of the corresponding terephthalate homopolymer.

It is still a further and particular object of this invention to provide a facile method for the production of the copolymers of the invention.

Other and additional objects and advantages of the present invention will become more apparent from the following description.

Accordingly, poly(tetramethylene terephthalate)-polyether block copolymers having significantly enhanced heat distortion temperatures without loss of other essential properties present in the corresponding terephthalate homopolymer have been discovered as well as a convenient method for their production that comprises reacting poly(tetramethylene terephthalate) with a polyether, either polyethylene oxide or poly(tetramethylene either glycol) or mixtures thereof, and wherein the ratio of poly (tetramethylene terephthalate) to polyether is such as to result in the incorporation in the product polymer of 1 percent to 7 percent by weight, and preferably 2 percent to 4 percent by weight, of said polyether based on the weight of terephthalate homopolymer.

DESCRIPTION OF THE PREFERRED EMBODIMENTS

The copolymers of the invention are prepared using conventional methods, but are unique in that the amount of polyether integrated into the linear polymer product is in a singularly reduced quantity and the method employed is a two-step process.

Thus, the polyester precursor for reaction sequentially with the required polyether is first prepared conveniently by a standard ester interchange reaction where, in a preferred procedure, one mole equivalent of the dimethyl ester of terephthalic acid is reacted with a mole equivalent, and preferably in excess thereof of, 1,4-butanediol, in the presence of a catalyst at 120° C to 235° C. Other butanediols, that is 1,2-butanediol and 1,3-butanediol, may also be employed in the practice herein described in amounts of up to 5 mol percent and even 10 mol percent by weight of the 1,4-butanediol present without adversely affecting the crystallinity properties of the desired block copolymeric products of the invention. Methanol formed by the interchange is distilled off, and indeed, since the interchange is an equilibrium process, the molecular weight of the polyester is determined materially by the efficiency with which methanol is removed from the reaction zone. Thus, heating is continued until methanol evolution is complete. Depending on the quantity of reactants, temperature, quantity and identity of the catalyst, the polymerization is completed over a period, minimally, of from about 60 minutes to several hours.

A metallic acetate, and preferably zinc acetate, is desirably employed as the catalyst in production of the polyester precursor together, optionally, with such additional additives as a color stabilizer, for example, tris-nonyl phenyl phosphite. The catalyst is normally present in an amount by weight of diol and phthalate of 0.05 percent to 0.1 percent.

The procedure results in the preparation of a low molecular weight prepolymer which is then converted to a high molecular weight thermoplastic, engineering block copolymer by successive reaction with a polyether. The terephthalate precursor can also be prepared by ester interchange from free terephthalic acid and the acetate of the diol by means equally well-known to those skilled in the art to which this invention pertains. The molecular weight of the precursor, poly(tetramethylene terephthalate), expressed as the number average molecular weight ($M_n$) employed within the practice of the invention is within the range of about 540 to 700. The terms "molecular weight" and the expression "$M_n$", as employed throughout this specification, refer to number average molecular weight, unless otherwise expressly indicated.

The foregoing poly(tetramethylene terephthalate) precursor is converted to a block copolymer incorporating randomly disposed polyether by reaction of the precursor or prepolymer with the polyether in a temperature range of 220° C., and preferably 240° C., to 260° C., and even more particularly, 250° C. to 255° C., under vacuum at less than one millimeter (mm) pressure for a period of 1 to 2 hours. Longer reaction periods are avoided normally to prevent irreversible thermal degradation of the reaction and polymer product. Accordingly, a catalyst is usually employed to most effectively complete the reaction within the desired period. While a wide variety of well-known catalyst systems can be employed, organic or inorganic titanates, such as tetrabutyl titanate, titanate esters, lathanum titanate, and complex titanates derived from alkali or alkaline earth metal alkoxides are very effective alone or preferably in combination with magnesium, calcium or zinc acetate or with a color stabilizer such as an organic phosphite and, more particularly, one such as tris-nonyl phenyl phosphite. The catalyst is normally employed for greatest effectiveness within the range of 0.05 percent to 0.5 percent based on the weight of reactant poly (tetramethylene tere-phthalate) and polyether.

The reactants are admixed in a ratio of 1 to 7, or slightly in excess of 7, parts, and preferably 2 to 4 parts, by weight of polyether to each 100 parts by weight of poly(tetramethylene terephthalate). The reaction is preferably undertaken in the melt without added solvent, but inert solvents can be used to facilitate removal of volatile components at low temperatures, if desired. Both batch and continuous methods can be used for production of prepolymer and block copolymer.

The polyethers essential to securing the significantly improved block copolymers of the inventions are polyethylene oxide and poly(tetramethylene ether glycol) having number average molecular weight of from 600 to 6000, and preferably from 2000 to 4000.

While the reaction is normally limited to use of a single polyether; both of the foregoing polyethers may be employed simultaneously in ratios of one to the other from anywhere in excess of zero to less than one hundred percent by weight or otherwise. Varying molecular weights of the polyether within the parameters herein defined can be employed simultaneously as well.

The block copolymers prepared as described herein are characterized, as noted, by random distribution of the polyether components and by a number average molecular weight ($M_n$) within the range of about 20,000 to 35,000. The polyether distributed is within the range of 1 percent to 7 percent, and preferably, 2 percent to 4 percent, by weight of the poly(tetramethylene terephthalate) percent therein.

While conventional inorganic fillers, such for example, as clays, carbon black, glass beads, alumina and silica gel can be incorporated in the product copolymers in concentrations of from 5 to 50 percent by weight of the block copolymer, to improve the physical properties thereof, most preferred for this purpose are the reinforcing fillers formed of particulate glass fibers, that is chopped glass strands or rovings, and, optionally but preferably, those coated as by spraying with a coupling agent, preferably a silane coupling agent, and, most particularly, an organofunctional silating agent illustrative of which are gamma mercapto propyl trimethoxy silane, gamma glycidoxypropyl trimethoxy silane and, though less desirably within this group of agents, vinyl triethoxy silane. The reinforcing filler is incorporated in the block copolymer after extrusion and pelletization of the latter in conventional manner, and with or without addition of a standard lubricating agent, in an amount by weight of the copolymer of about 10 percent to 30 percent and preferably at the upper end of this range. Illustrative commericaly available fiber glass fillers are Eastman Kodak, grade P219AX2 or Pittsburgh Plate Glass fiber grade 6532. The particulate glass fibers for use herein are those having a range of one-eighth ($\frac{1}{8}$) of one inch to one-fourth ($\frac{1}{4}$) of one inch in length and an aspect ratio (length to diameter respectively) within the range of 3:1 to 10:1. To fiber glass when incorporated in the resins of the invention in amounts up to 30 percent by weight tend to impart an improved notched Izod impact, while permitting the resin to retain its heat distortion temperature of about 210° C. to 220° C. even at the less preferred upper end of the range of polyether content, that is 7 percent.

Other additives can be included in the product poly(tetramethylene terephthalate)-polyethylene oxide and poly(tetramethylene terephthalate)-poly(tetramethylene) ether glycol copolymers or copolymers incorporating mixtures of said polyethers contemplated by the invention.

Illustrative stabilizers include those conventionally adapted to prevent polyester degradation resulting from heat or ultraviolet radiation; illustratively, various amines, phenols, and combinations and derivatives thereof, oximes, polymeric phenolic esters, hydroxyazines and salts of multivalent metals in which the metal is in its lower valence state; inorganic metal salts of hydroxides, as well as metallic organic complexes.

Illustrative of the foregoing stabilizers are nickel dibutyl dithiocarbamate, manganous salicylate, copper 3-phenylsalicylate; N,N'bis (beta-naphthyl)-p-phenylenediamine, N,N'-bis [1-methylhepthyl]-p-phenylenediamine and either phenyl-beta-naphthyl amine or its reaction product with aldehydes, 4,4'-bis (2,6-ditertiary butylphenyl), 1, 3,5-trimethyl-2,4,6-tris[3,5-ditertiarybutyl-4 hydroxybenzyl]benezene and 4,4'-butylidene-bis(6-tertiary-butyl-m-cresol).

The foregoing stabilizers, as well, for example, as the phosphite color stabilizer referred to hereinabove, are employed in an operative range of 0.05 percent to 2.0 percent, and a preferred concentration of 0.1 percent to 0.5 percent by weight of the block copolymer.

The block copolymers prepared as described herein, preserving the essential properties of the corresponding terephthalate homopolymer while manifesting heat deflection temperatures as high, for example, as 72° C. provide valuable engineering plastics and are particularly effective in injection, compression and blow molding applications using conventional procedures and offering, as a result, significant advantages in use over other thermoplastic polymers usually considered for these applications. As evident from the foregoing description, the block copolymers of the invention are not elastomers. The product resins are readily calendered or extruded to provide sheet or tubing.

These resins are readily prepared for use in any of a variety of applications in a powdered or particulate form. The resins of the invention can also be used in fusion bonding and powder coating techniques utilizing, for example, a fluidized bed; and in coating and adhesive procedures such as dip, roller and knife coating and hot-melt adhesives.

The following examples are further illustrative of the invention. As employed in these examples and in the appended claims, all parts, proportions and percentages are by weight unless otherwise expressly indicated.

The block copolymers of the invention are also useful in making blends of low cost resins having some apparent usefulness for purposes similar to those of the unblended resins, but with a material loss of the advantages inherent in the copolymers of the invention when used alone, as described herein, with the block copolymers of the invention. Illustrative blends include 5 percent to 50 percent, and more desirably, where improved impact properties, within the context of such blends, are desired, 15 percent to 35 percent, of poly (vinyl chloride) by weight of the block copolymers of the invention. As indicated, such blends manifest a significant decrease in tensile and heat distortion properties.

EXAMPLE 1

This example illustrates the preparation of a block copolymer in accordance with the invention.

The following reactants, in the amounts indicated, were introduced into a reaction vessel with a stirrer, distillation column, vacuum and temperature control and heated with agitation to 120° C.

| | |
|---|---|
| 1,4-butanediol: | 1600 grams |
| dimethytherephthalate: | 2464 grams |
| Tris nonylphenyl phosphite: | 1.4 grams |

After agitation for a period of about 5 minutes, the catalyst, zinc acetate, in amount of 2.79 grams, was introduced into the reaction mixture and agitation and heating continued for about two hours during which period the temperature of the reaction vessel was raised to 180° C. The temperature of the vessel was then rapidly elevated to 230° C to 235° C. to complete formation of the precursor product, poly(tetramethylene terephthalate) after a period of about 90 minutes.

A second reaction vessel identical to the first such vessel described hereinabove was then preheated to about 250° C. to 255° C. and the following components charged thereto in the amounts indicated:

| | |
|---|---|
| poly(tetramethylene terephthalate) precursor recovered from the initial reaction described in Example 1* | 1180 grams |
| poly(ethylene oxide)** | 30 grams |
| tris nonyl phenyl phosphite | .025 grams |
| titanate chelate of 2-ethyl-1,3-hexanediol (TYZOR OG) | .50 grams |

*$M_n$: 540; degree of polymerization (DP) :2
**$M_n$: 4000; carbon to oxygen mole ratio: 1.5 to 1 respectively.

Heating of the reaction mixture was continued for a period of about two hours under a vacuum maintained at one millimeter (1mm.) of mercury. The polymer recovered, poly(tetramethylene terephthalate)-poly(ethylene oxide) block copolymer incorporating about 2.5 percent by weight of polyethylene oxide, had a melting point of 217° C.

EXAMPLE 2

This example illustrates the preparation of a block copolymer according to the practice of the invention and as described in Example 1 except that the proportion of polyether incorporated in the product polymer has been increased.

The process of Example 1 was repeated substituting in excess of 7 percent by weight of polyethylene oxide (molecular weight: 2000) in the reaction mixture with poly (tetramethylene terephthalate). The product secured was poly(tetramethylene terephthalate)-polyethylene oxide block copolymer wherein the polyethylene oxide component is present in an amount by weight of about 7 percent.

EXAMPLE 3

This example illustrates the preparation of a block copolymer as described in Example 2 except that the polyether had a different molecular weight.

The procedure of Example 2 was repeated with polyethylene oxide having a molecular weight of about 6000. The product resin was poly(tetramethylene terephthalate)-polyethylene oxide block copolymer wherein the polyethylene oxide was present in an amount of about 7 weight percent.

EXAMPLE 4

This example illustrates the preparation of a block copolymer of the invention incorporating a different polyether component from that of the prior examples.

The process of Example 1 was repeated substituting poly(tetramethylene etherglycol) having a molecular weight ($M_n$) of about 2000 and a carbon to oxygen mole ratio of 3 to 1, respectively, in the same relative weight percentage, i.e. 3 percent, for the polyethylene oxide of that Example. The product secured was determined to be poly(tetramethylene terephthalate)-poly(tetramethylene ether glycol) block copolymer.

EXAMPLE 5

This example illustrates the preparation of a block copolymer as described in Example 4, but incorporating a higher percentage of polyether.

The procedure of Example 4 was repeated, but substituting 7 percent by weight of the poly(tetramethylene ether glycol) reactant in the reaction mixture. The product resin, poly(tetramethylene terephthalate)-poly(tetramethylene ether glycol) block copolymer, having about 7 percent of said polyether incorporated therein was secured.

EXAMPLE 6

This example illustrates the physical properties of the block copolymers prepared in accordance with the invention.

The block copolymers of Examples 1 to 5 inclusive were injection molded as was a sample of the corresponding homopolymer, poly(tetramethylene terephthalate), using standard processing apparatus. The resulting test samples prepared from each of Examples 1 to 5 were designated Copolymers A to E, respectively, and so appear in Table I following together with the results of the tests of which these samples were subjected. The poly(tetramethylene terephthalate) homopolymer bears the designation "Homopolymer" in Table I.

TABLE I

| Property | ASTM Procedure | Copolymer A | B | C | D | E | Homopolymer |
|---|---|---|---|---|---|---|---|
| Heat distortion at 264 pounds per square inch (psi) in degrees Centigrade (° C) | D648-72 | 71 | 65 | 63 | 72.5 | 64 | 58 |
| Izod impact notches, foot pounds per inch | D256-72 (method A) | 0.75 | 0.34 | 0.17 | 0.38 | 0.51 | 0.55/0.61 |
| Yield, tensile in psi | D638-72 | 8500 | 5600 | 6700 | 6700 | 7300 | 7600 |
| Break, tensile in psi | D638-72 | 8500 | 6600 | 6700 | 6600 | 6000 | 5700 |
| Percentage of elongation at break | D638-72 | 10 | 350 | 16 | 400 | 400 | 255 |
| Hardness, Shore D | D2240-68 | 75 | 72 | 76 | 75 | 73 | 77 |

TABLE I-continued

| Property | ASTM Procedure | Copolymer | | | | | Homopolymer |
|---|---|---|---|---|---|---|---|
| | | A | B | C | D | E | |
| Injection Molding Performance | | | | | | | |
| Minimum Fill, psi | D955-73 | 4000 | 5000 | — | 4000 | 5000 | 13,000/16,000 |
| Shrinkage, ¼ × ¼ × ⅛ inch Bar or Rod | D955-73 | 2.4 | 3.1 | — | 2.4 | 2.4 | 2.4 |
| Shrinkage, ⅛ inch thick Die D Dumbbell | D955-73 | 0.6 | 1.0 | — | <0.1 | <0.1 | <0.1 |

Table I shows the significant increase in the heat distortion temperature of the block copolymers without a sacrifice of the essential properties present in the corresponding homopolymer.

EXAMPLE 7

The example illustrates the method of formulating block copolymers incorporating fillers to provide improved impact strength thereto.

Samples of the powdered block copolymers prepared as described in Examples 1 to 5 are admixed in a tumbler with thirty percent, by weight of said copolymer, of sized fiber glass rovings of three-sixteenths of one inch in length and having an aspect dimension varying within the range of 3 to 1 to 10 to 1 marketed by Eastman Kodak and bearing the grade designation P219AX3. This mixture is then extruded and pelletized in standard manner. The resulting product manifests improved physical properties.

EXAMPLE 8

This example illustrates the incorporation of a filler similar to that described in Example 7, but in lesser amount.

The practice of Example 7 is repeated using sized glass rovings of identical dimensions manufactured by Pittsburgh Plate Glass and bearing the fiber grade designation 6532. The fiber glass for admixture with the block copolymer is present in an amount by weight of ten percent.

The resulting product manifests improved physical properties.

It will be evident that the terms and expressions which have been employed are used as terms of description and not of limitation. There is no intention in the use of such terms and expressions of excluding equivalents of the features shown and described or portions thereof and it is recognized that various modifications, by way of illustration, but not of limitation, variations in proportions, procedures and materials are possible within the scope of the invention claimed.

What is claimed is:

1. A thermoplastic block copolymer having an elevated heat deflection temperature, said block copolymer comprising a block copolymer of poly(tetramethylene terephthalate) and a polyether selected from the group consisting of polyethylene oxide, poly(tetramethylene ether glycol) and mixtures thereof; wherein said polyether is present in an amount between about 1 percent to and about 7 percent by weight based on poly(tetramethylene terephthalate) and is randomly distributed therein.

2. A thermoplastic block copolymer as claimed in claim 1 wherein said polyether is polyethylene oxide.

3. A thermoplastic block copolymer as claimed in claim 1 wherein said polyether is poly(tetramethylene ether glycol).

4. A thermoplastic block copolymer as claimed in claim 1 wherein said polyether is present in an amount by weight of said poly(tetramethylene terephthalate) of 2 percent to 4 percent.

5. A thermoplastic block copolymer as claimed in claim 1 wherein said polyether has a molecular weight of 600 to 6000.

6. A thermoplastic block copolymer as claimed on claim 5 wherein said poly(tetramethylene terephthalate) has a molecular weight of 540 to 700 and said polyether has a molecular weight of 2000 to 4000.

7. A thermoplastic block copolymer as claimed in claim 6 wherein said polyether is present in an amount of about 2.5 percent by weight of said poly(tetramethylene terephthalate).

8. A thermoplastic block copolymer as claimed in claim 1 including in admixture therewith a particulate fiber glass filler in an amount by weight of said copolymer of at least 10 percent.

9. A thermoplastic block copolymer as claimed in claim 8 wherein said particulate fiber glass filler is present in an amount by weight of said block copolymer of 10 percent to 30 percent.

10. Process for producing poly(tetramethylene terephthalate) polyether block copolymer wherein said polyether is randomly distributed in said copolymer in an amount by weight between about 1 and about 7% based on poly(tetramethylene terephthalate) which comprises reacting previously formed poly(tetramethylene terephthalate) having a molecular weight between 540 and 700 with from about 1 to about 7% by weight based on poly(tetramethylene terephthalate) of a polyether selected from the group consisting of polyethylene oxide, poly(tetramethylene ether glycol) and mixtures thereof, said polyether having a molecular weight of from about 2000 to about 4000 and said reaction being carried out under vacuum at a reaction temperature from about 220° C to about 260° C for a period of about 1 to about 2 hours in the presence of an inorganic or organic titanate catalyst.

11. The process as claimed in claim 10 wherein said polyether is polyethylene oxide.

12. The process of claim 10 wherein said polyether is poly(tetramethylene ether glycol).

13. The process as claimed in claim 10 wherein said polyether is present in an amount by weight of 2 percent to 4 percent by weight of said poly(tetramethylene terephthalate).

14. The process as claimed in claim 10 wherein said polyether has a molecular weight of from 600 to 6000.

15. The process of claim 10 wherein said polyether is polyethylene oxide having a molecular weight of 2000 to 4000 and a carbon to oxygen ratio of about 1.5.

16. The process of claim 10 wherein said polyether is poly(tetramethylene ether glycol) having a molecular weight of 2000 to 4000 and a carbon to oxygen ratio of about 3.0.

17. The process of claim 10 wherein there is admixed with said block copolymer at least ten percent by weight of said block copolymer of a particulate glass fiber filler.

18. The process of claim 17 wherein said filler is present in an amount by weight of said block copolymer of 10 percent to 30 percent.

19. The process of claim 18 wherein the particulate glass fibers of said filler are from one-eighth (⅛) to one quarter (¼) of one inch in length and have an aspect ratio of 3:1 to 10:1.

* * * * *